United States Patent
Jolad et al.

(10) Patent No.: US 11,163,653 B2
(45) Date of Patent: *Nov. 2, 2021

(54) STORAGE CLUSTER FAILURE DETECTION

(71) Applicant: NetApp Inc., Sunnyvale, CA (US)

(72) Inventors: Amarnath Jolad, Bangalore (IN);
Kazunobu Nishime, Milpitas, CA (US);
Iswarya Ayyappan, Bangalore (IN);
Ankit Batra, Bangalore (IN)

(73) Assignee: NetApp Inc., San Jose, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 16/679,823

(22) Filed: Nov. 11, 2019

(65) Prior Publication Data

US 2020/0073768 A1    Mar. 5, 2020

Related U.S. Application Data

(63) Continuation of application No. 15/820,784, filed on Nov. 22, 2017, now Pat. No. 10,489,254, which is a
(Continued)

(51) Int. Cl.
*G06F 11/00* (2006.01)
*G06F 11/20* (2006.01)

(52) U.S. Cl.
CPC ...... *G06F 11/2007* (2013.01); *G06F 11/2025* (2013.01); *G06F 11/2028* (2013.01);
(Continued)

(58) Field of Classification Search
CPC ............. G06F 11/1448; G06F 11/1456; G06F 11/1458; G06F 11/1464; G06F 11/1469;
(Continued)

(56) References Cited

U.S. PATENT DOCUMENTS 6,393,485 B1 * 5/2002 Chao ............... G06F 11/1425
709/231
6,643,795 B1 * 11/2003 Sicola .............. G06F 11/2069
714/11
(Continued)

OTHER PUBLICATIONS

NetApp, Data ONTAP 8.2 "High-Availability and MetroCluster Configuration Guide" for 7-Mode, May 2013, 259 pages, reprinted from the Internet at: https://library.netapp.com/ecm/ecm_download_file/ECMP1210206.
(Continued)

*Primary Examiner* — Michael Maskulinski
(74) *Attorney, Agent, or Firm* — Cooper Legal Group, LLC

(57) ABSTRACT

Direct monitoring of a plurality of storage nodes in a primary cluster is performed based on connectivity with the storage nodes. Indirect monitoring of a first storage node is performed, in response to direct monitoring of the first storage node indicating failure of the connectivity with the first storage node, wherein a second storage node of the plurality of nodes is a backup node for the first storage node. The indirect monitor of the first storage node indicates failure of the first storage node in response to performance of storage access operations by the second storage node that were previously performed by the first storage node. A cluster-switch operation is initiated to switch to from the primary cluster to a backup cluster based on an occurrence of at least one cluster-failure condition that comprises the indirect monitor of the first storage node indicating failure of the first storage node.

20 Claims, 9 Drawing Sheets

Related U.S. Application Data continuation of application No. 14/718,346, filed on May 21, 2015, now Pat. No. 9,842,033.

(60) Provisional application No. 62/078,955, filed on Nov. 12, 2014.

(52) U.S. Cl.
CPC ...... *G06F 11/2046* (2013.01); *G06F 11/2048* (2013.01); *G06F 11/2097* (2013.01)

(58) Field of Classification Search
CPC ............. G06F 11/2007; G06F 11/2025; G06F 11/2028; G06F 11/2046; G06F 11/2048; G06F 11/2097
See application file for complete search history.

(56) References Cited

U.S. PATENT DOCUMENTS

| | | | |
|---|---|---|---|
| 9,507,678 | B2 | 11/2016 | Panara et al. |
| 10,019,321 | B1* | 7/2018 | Aron ................. H04L 61/30 |
| 2008/0250267 | A1* | 10/2008 | Brown ................. G06F 11/1482 |
| | | | 714/4.1 |
| 2014/0047263 | A1 | 2/2014 | Coatney et al. |
| 2015/0278039 | A1 | 10/2015 | Bogdanov et al. |
| 2016/0098330 | A1 | 4/2016 | Mu et al. |
| 2017/0339005 | A1 | 11/2017 | Yuan et al. |

OTHER PUBLICATIONS

NetApp, Clustered Data ONTAP 8.3 "MetroCluster Management and Disaster Recovery Guide", Jan. 2015, 107 pages, reprinted from the Internet at: https://library.netapp.com/ecm/ecm_download_file/ECMP1636018.

NetApp, Inc., Clustered Data ONTAP 8.2, "High-Availability Configuration Guide", May 2013, 108 pages, Reprinted from the Internet at: https://library.netapp.com/ecm/ecm_download_file/ECMP1196905.

"VMware, VMware vSphere 5.x and 6.0 support with NetApp MetroCluster (2031038)", Jul. 27, 2016, Knowledge Base, 9 pages, reprinted from the Internet at: https://kb.vmware.com/s/article/2031038.

* cited by examiner

STORAGE CLUSTER FAILURE DETECTION

RELATED APPLICATIONS

This application claims priority to and is a continuation of U.S. application Ser. No. 15/820,784, filed on Nov. 22, 2017 and titled "STORAGE CLUSTER FAILURE DETECTION," which claims priority to and is a continuation of U.S. Pat. No. 9,842,033, filed on May 21, 2015 and titled "STORAGE CLUSTER FAILURE DETECTION," which claims priority to and is a continuation of U.S. Provisional Application No. 62/078,955, filed on Nov. 12, 2014 and titled "STORAGE CLUSTER FAILURE DETECTION," which are incorporated herein.

BACKGROUND

Aspects generally relate to the field of distributed storage, and, more particularly, to detection of storage cluster failures.

Whether maintaining customer data or their own data, businesses require always available or highly available data and protection of that data. To support these requirements, data often resides across multiple storage systems in multiple sites that are often great distances apart. One reason these sites are separated by great distances is to prevent a single catastrophe impacting data availability. Metrics used to define the availability requirements include recovery point objective (RPO) and recovery time objective (RTO). A business specifies an RTO as the maximum amount of time that the business tolerates lack of access to the business' data. A business specifies an RPO as the amount of data in terms of time that can be lost due to an interruption. For instance, a business can specify an RTO as 15 seconds. In other words, the business will accept at most 15 seconds from the time of a service interruption or failure to the time their data is again available. For an RPO, a business can specify five seconds. That means that the business will not accept losing any more than the data written (e.g., new writes, updates, etc.) in the five seconds that precede a failure or interruption.

SUMMARY

Data can be stored across different storage nodes in devices or clusters communicatively coupled together. A metrocluster can be defined as a combination of two or more clusters that provide a synchronous mirroring of the data stored in the clusters in case of one of the clusters fails or goes into a disaster state. For example, the clusters can be configured such that data in one cluster (a primary cluster) can be replicated in a different cluster (a backup cluster). Accordingly, the backup cluster can take over and become the primary cluster if the primary cluster goes into a failed state. For example, the occurrence of a disaster event (e.g., flood, fire, power failure, etc.) can cause failure of an entire cluster. Some aspects can differentiate between lack of connectivity with a cluster and failure of the entire cluster. In response to failure of the entire cluster, a disaster recovery operation can be triggered to cause a switchover to a backup storage cluster. According to some aspects, disaster recovery from a cluster failure can be provided that has an RPO of zero and an RTO of near zero.

This summary section is provided as an initial glimpse into the disclosure, and is not a comprehensive summary. The content of the summary is not intended to limit scope of the claims and should not be used to limit scope of the claims.

BRIEF DESCRIPTION OF THE DRAWINGS

The present aspects may be better understood by referencing the accompanying drawings.

DESCRIPTION OF EXAMPLE ILLUSTRATIONS

The description that follows includes example systems, methods, techniques, instruction sequences and computer program products that includes techniques of the features described herein. However, it is understood that the described features may be practiced without these specific details. In instances, well-known instruction instances, protocols, structures and techniques have not been shown in detail in order not to obfuscate the description.

Overview

Some aspects provide a secure, fast (e.g., less than 30 seconds), and multiple layered approach to detect and verify (validate) a potential cluster disaster. A cluster can include a number of nodes for storage of data. According to some features, each node can be associated with a different node in the same cluster, thereby forming a high availability pair. The two nodes (referred to as node A1 and node A2) that form a high availability pair can separately process read, write, delete, etc. operations for accessing storage disk(s). According to some aspects, each node of a high availability pair can access the storage disk(s) of the other node. For example, node A1 can access the storage disk(s) of node A2, and vice versa. Accordingly, if node A1 is in a failed state, node A2 can take over the read and write operations for node A1, and vice versa. Also, a primary cluster can also have a backup cluster that is to take over for the primary cluster if the primary cluster is in a failed state. According to some aspects, a node, a high availability pair, and a cluster can be considered logical objects in the metrocluster.

The primary cluster can be determined to be in a failed state based on direct, indirect, and aggregated monitoring of the logical objects in the metrocluster. For example, the primary cluster can be determined to be in a failed state based on reachability (connectivity) and operational states of one or more of the logical objects (e.g., the nodes in the primary cluster and backup cluster, the high availability pairs in the primary cluster and the backup cluster, the primary cluster, and the backup cluster) in the metrocluster. As an example, the primary cluster can be determined to be in a failed state in response to 1) both direct and indirect monitoring of nodes and high availability pairs in the primary cluster indicating all nodes and high availability pairs are in a failed state, and 2) both direct and indirect monitoring of the primary cluster. According to some aspects, this monitoring can be performed remote from the clusters.

Example System

Figure 1:
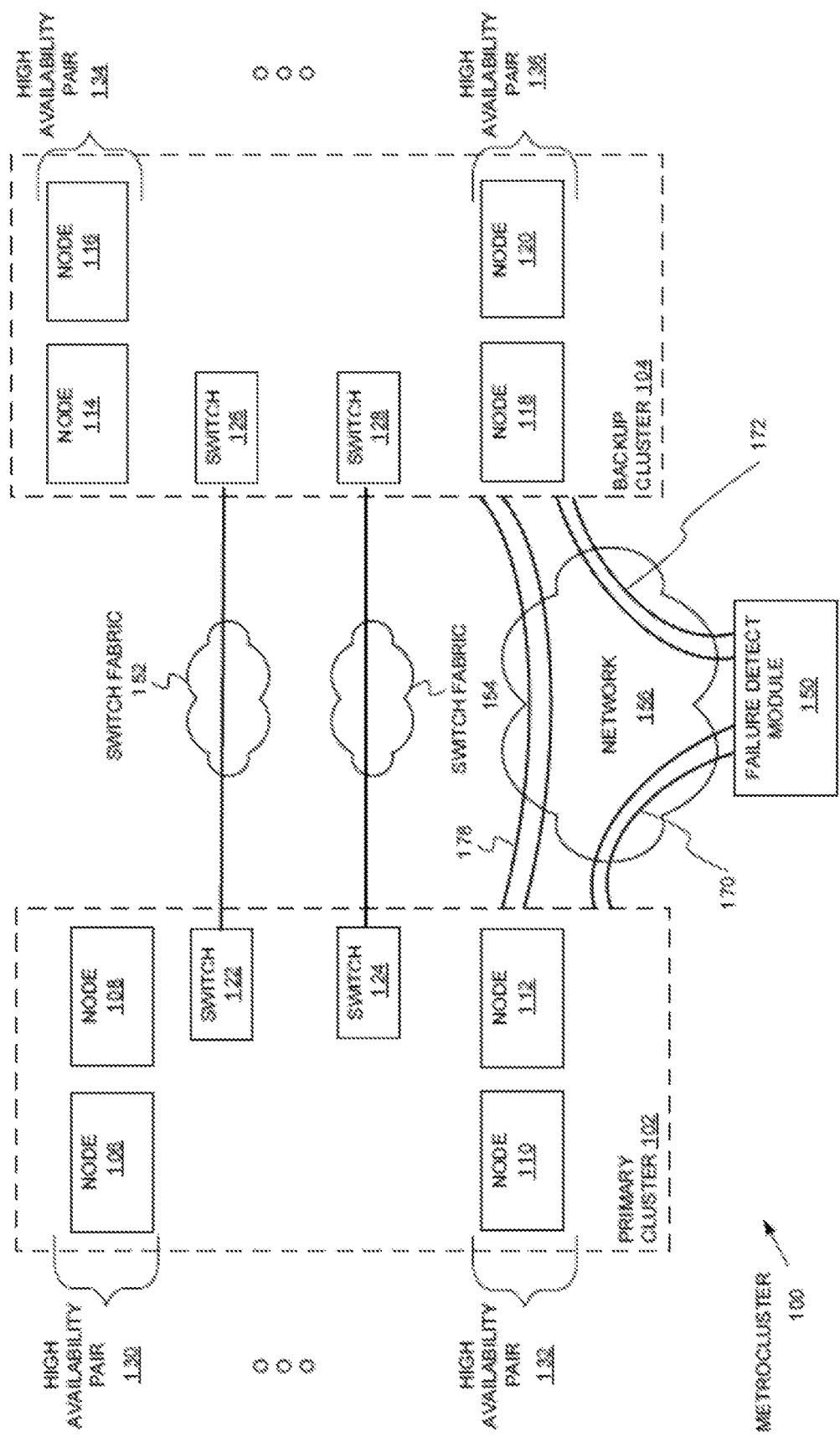
FIG. 1 depicts a metrocluster having multiple clusters for distributed storage, according to some features.

FIG. 1 depicts a metrocluster having multiple storage clusters for distributed storage, according to some features. FIG. 1 depicts a metrocluster 100 that includes multiple clusters (a primary cluster 102 and a backup cluster 104). Each cluster can include a number of nodes interconnected that can be configured to provide storage service for data containers or objects (e.g., files) across one or more data volumes. The data and configuration of the primary cluster 102 can be mirrored at the backup cluster 104. Accordingly, if the primary cluster 102 fails, the backup cluster 104 can take over for the primary cluster 102.

In this example, the primary cluster 102 includes a node 106, a node 108, a node 110, and a node 112. The node 106 and the node 108 form a high availability pair 130. The node 110 and the node 112 form a high availability pair 132. The cluster 104 includes a node 114, a node 116, a node 118, and a node 120. The node 114 and the node 116 form a high availability pair 134. The node 118 and the node 120 form a high availability pair 136. In this example, each cluster includes four nodes forming two high availability pairs. The clusters can have a greater or lesser number of nodes and high availability pairs. A more detailed description of the high availability pairs (including the nodes and relationship among high availability pairs across the clusters) is set forth below in reference to FIG. 3.

The primary cluster 102 includes a switch 122, and the backup cluster 104 includes a switch 126. The nodes in the primary cluster 102 can communicate with the nodes in the backup cluster 104 through the switch 122 over a switch fabric 152 and through the switch 126. The switch fabric 152 can be a self-contained network over which the primary cluster 102 and the backup cluster 104 can communicate. Similarly, the primary cluster 102 includes a switch 124, and the backup cluster 104 includes a switch 128. The nodes in the primary cluster 102 can communicate with the nodes in the backup cluster 104 through the switch 124 over a switch fabric 154 and through the switch 128. The switch fabric 154 can also be a self-contained network over which the primary cluster 102 and the backup cluster 104 can communicate.

Accordingly, any node in the primary cluster 102 can communicate with any node in the backup cluster 104 and vice versa over either the switch fabric 152 or the switch fabric 154. Also, each node in the primary cluster 102 has a corresponding backup node in the backup cluster 104, such that data stored in the node in the primary cluster 102 is replicated at the corresponding backup node in the backup cluster 104. Therefore, in the event that the node or the entire primary cluster fails, the backup node in the backup cluster 104 can take over data storage operations. According to some aspects, the replication of the data from the nodes in the primary cluster 102 to the nodes in the backup cluster 104 occurs based on communications over the switch fabrics 152-154.

The metrocluster 100 also includes a network 156 for communications with and between the primary cluster 102 and the backup cluster 104. As shown, the network 156 is separate from the switch fabrics 152-154. The network 156 can be different types of communication networks, such as an Internet Protocol (IP) network. In this example, the primary cluster 102 is communicatively coupled to the backup cluster 104 over the network 156 through two network paths 178 (to provide redundant communication).

A failure detect module 150 is communicatively coupled to the primary cluster 102 and the backup cluster 104. As shown, the failure detect module 150 is communicatively coupled to the primary cluster 102 over the network 156 through two network paths 170 (to provide redundant communication). Similarly, the failure detect module 150 is communicatively coupled to the backup cluster 104 over the network 156 through two network paths 172 (to provide redundant communication). In this example, the failure detect module 150 is remote to the primary cluster 102 and the backup cluster 104. The failure detect module 150 can be hardware, software, firmware, or a combination thereof. For example, the failure detect module 150 can be software executing on a remote server for monitoring failure of the clusters in the metrocluster 100. FIG. 1 depicts two network paths from the failure detect module 150 to each of the primary cluster 102 and the backup cluster 104. However, as depicted to FIG. 2 (described below), there can be a greater number of network paths. In particular, redundant communication sessions can be established between the failure detect module 150 and each node in the primary cluster 102 and between the failure detect module 150 and the primary cluster 102. Similarly, redundant communication sessions can be established between the failure detect module 150 and each node in the backup cluster 104 and between the failure detect module 150 and the backup cluster 104.

Figure 2:
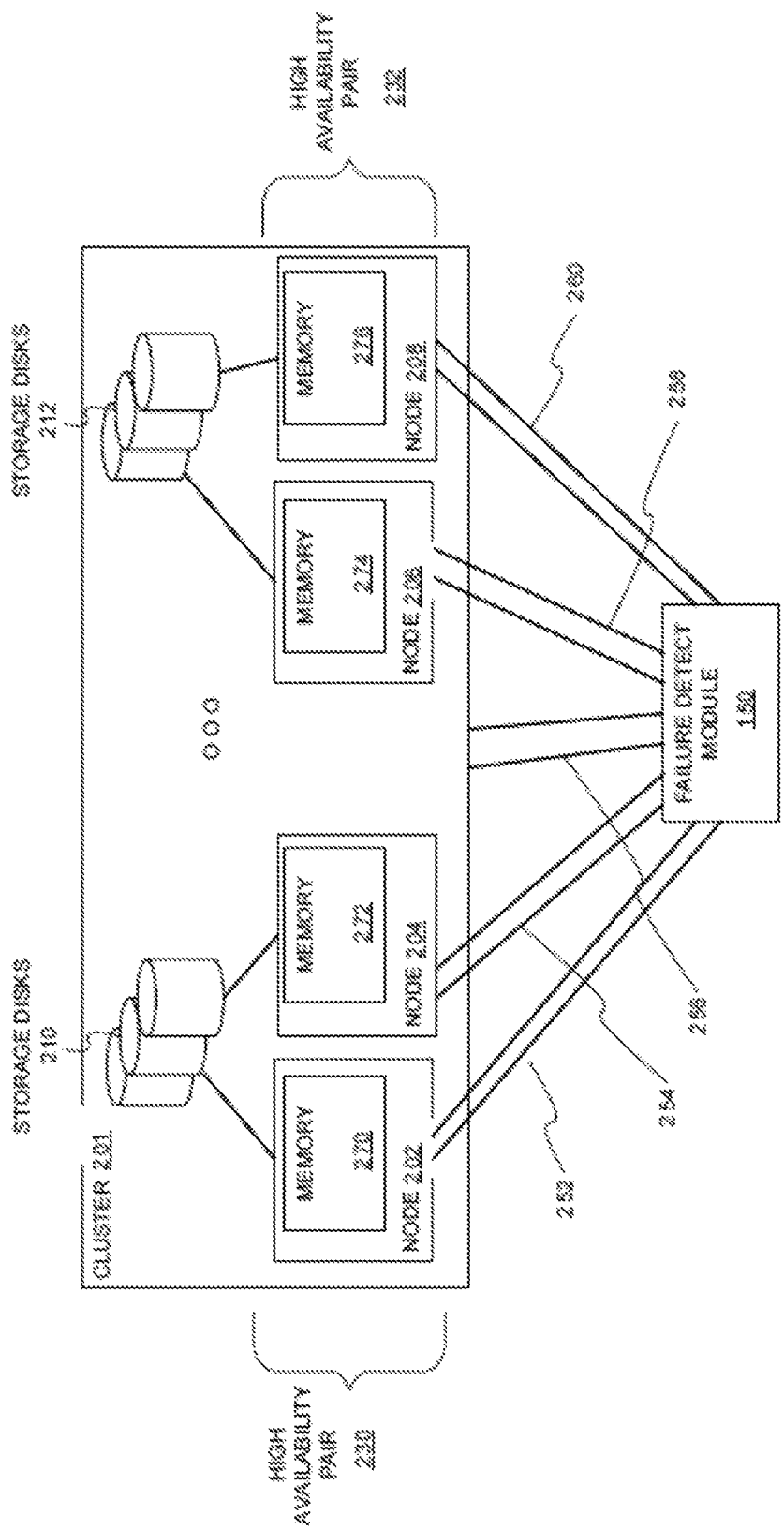
FIG. 2 depicts a block diagram of a cluster and connectivity with a remote failure detect module in a metrocluster, according to some features.

FIG. 2 depicts a block diagram of a cluster and connectivity with a remote failure detect module in a metrocluster, according to some features. In particular, FIG. 2 depicts a cluster 201 that can represent the primary cluster 102 or the backup cluster 104 of FIG. 1. The cluster 201 includes a node 202, a node 204, a node 206, and a node 208. The node 202 includes a memory 270. The node 204 includes a memory 272. The node 206 includes a memory 274. The node 208 includes a memory 276. The memories 270-276 can be different types of machine-readable media. According to some aspects, the memories 270-276 are non-volatile random access memories (NVRAM). The node 202 and the node 204 together form a high availability pair 230. Also, the node 202 and the node 204 have shared access to storage disks 210. The node 206 and the node 208 together form a high availability pair 232. Also, the node 206 and the node 208 have shared access to storage disks 212.

The nodes that form a high availability pair provide redundancy within the same cluster such that if one node fails, the other node in the pair can take over processing of operations that were to be performed by the one node. For example, if the node 202 is in a failed state, the node 204 can take over any operations for reading from or writing to data to the storage disks 210 that were to be performed by the node 202.

Also, the two nodes can be allocated different disks in the backend storage device. For example, assume there are six disks (disks 1-6) in the storage disks 210. The node 202 can been allocated disks 1-3, and the node 204 can be allocated disks 4-6. Accordingly, if the node 202 fails, the node 204 can access the node 202's disks and vice versa. The two nodes in a high availability pair can also redundantly store data in their machine-readable media (e.g., random access memory (RAM)). For example, the data in the memory 270 can be mirrored in the memory 272. Accordingly, if the node 202 is to update data in the storage disks 210 based on a write operation received, the write operation can be stored in the memory 270 and copied to the memory 272. Then, if the node 202 goes into a failed state prior to completing the write operation, the node 204 can use the copied write operation in its memory 272 to update the storage disks 210.

Each node and the cluster itself can have a separate network address. As shown, the failure detect module 150 can establish a redundant communication session 252 with the node 202 using the network address of the node 202. The failure detect module 150 can establish a redundant communication session 254 with the node 204 using the network address of the node 204. The failure detect module 150 can establish a redundant communication session 258 with the node 206 using the network address of the node 206. The failure detect module 150 can establish a redundant communication session 260 with the node 208 using the network address of the node 208. The failure detect module 150 can also establish a redundant communication session 256 with the cluster 201 using the network address of the cluster 201.

Figure 3:
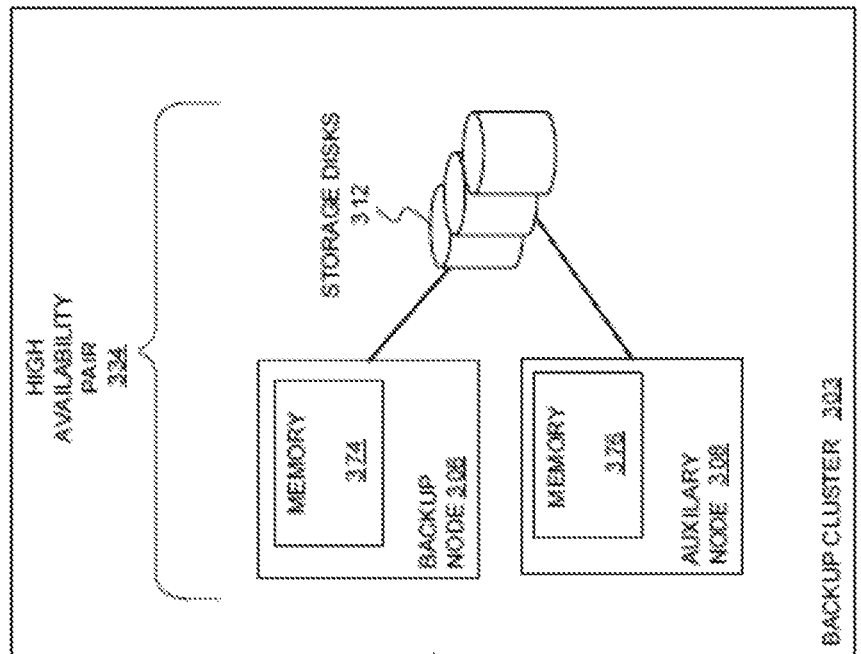
FIG. 3 depicts a block diagram of relationships of nodes in high availability pairs across multiple clusters, according to some features.
Figure 3:
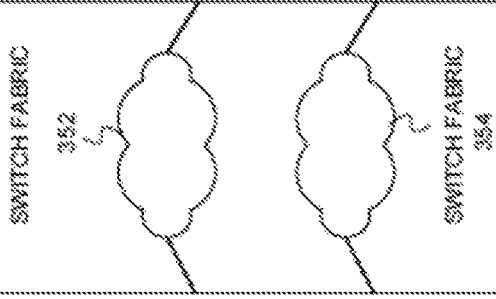
Figure 3:
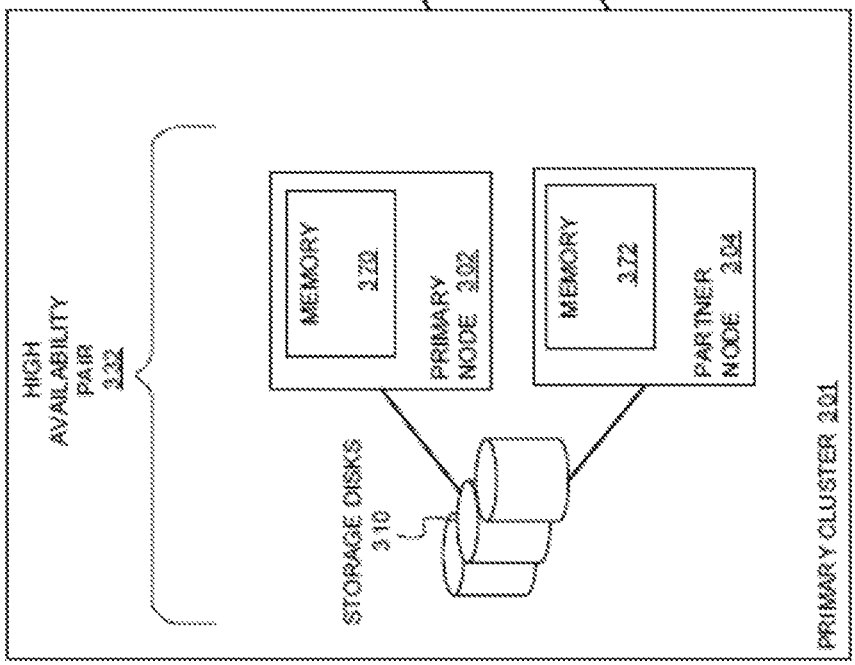

FIG. 3 depicts a block diagram illustrating relationships of nodes in high availability pairs across multiple clusters, according to some features. In particular, FIG. 3 depicts relationships among nodes in a first high availability pair in a first cluster with nodes in a second high availability pair in a second cluster. FIG. 3 depicts a primary cluster 301 and a backup cluster 303 that are communicatively coupled together through a switch fabric 352 and a switch fabric 354 (similar to connectivity described above for the metrocluster 100 of FIG. 1). The primary cluster 301 includes a high availability pair 332 that includes a primary node 302 and a partner node 304. The primary node 302 and the partner node 304 have shared access to storage disks 310. The primary node 302 includes a memory 370, and the partner node 304 includes a memory 372. The data stored in the memory 370 of the primary node 302 can be synced with the data stored in the memory 372 of the partner node 304. Also, the data stored in the memory 372 of the partner node 304 can be synced with the data stored in the memory 370 of the primary node 302. Therefore, any changes to the data in the memory 370 can be copied to the memory 372 and vice versa. The memories 370-372 can be different types of machine-readable media. According to some aspects, the memories 370-376 are non-volatile random access memories (NVRAM). Accordingly, the partner node 304 can take over operations for the primary node 302 if the primary node 302 is in a failed state and vice versa (as described above for nodes in a high availability pair).

The backup cluster 303 includes a high availability pair 334 that serves as a backup to the high availability pair 332 in the primary cluster 301 if the primary cluster 301 has failed. The high availability pair 334 includes a backup node 306 and an auxiliary node 308. The backup node 306 and the auxiliary node 308 have shared access to storage disks 312. The backup node 306 includes a memory 374, and the partner node 304 includes a memory 376. The data stored in the memory 374 of the backup node 306 can be synced with the data stored in the memory 376 of the auxiliary node 308. Also, the data stored in the memory 376 of the auxiliary node 308 can be synced with the data stored in the memory 374 of the backup node 306. Therefore, any changes to the data in the memory 374 can be copied to the memory 376 and vice versa. The memories 374-376 can be different types of machine-readable media. The auxiliary node 308 can assume operations that were to be performed by the backup node 306 if the backup node 306 is in a failed state and vice versa (as described above for nodes in a high availability pair). If the primary cluster 301 goes into a failed state, the backup node 306 can assume operations for the primary node 302. In this example, the auxiliary node 308 would assume the role of the partner node 304.

The primary node 302 can be communicatively coupled to the backup node 306 and the auxiliary node 308 through the switch fabrics 352-354. The communication between the primary node 302 and the backup node 306 can be on a different communication session from the communication session between the primary node 302 and the auxiliary node 308. According to some aspects, the data stored in the memory 370 of the primary node 302 can be copied to the memory 374 of the backup node 306 and to the memory 376 of the auxiliary node 308. Also, the data stored in the memory 372 of the partner node 304 can be copied to the memory 374 of the backup node 306 and to the memory 376 of the auxiliary node 308. As described above, the data stored in the memory can be an I/O operation (e.g., write operation). Accordingly, the backup node 306 or the auxiliary node 308 can keep the storage disks 312 in sync with the storage disks 310 to enable the backup cluster 303 to take over for the primary cluster 301 if the primary cluster 301 goes into a failed state. Also, the data stored in the storage disks 310 can be mirrored or replicated in the storage disks 312.

As further described below, the determination of whether the primary cluster 301 has failed can be based on one or more of the following: 1) whether the communication session between the primary cluster 301 and the backup cluster 303 has failed, 2) whether the communication session between the primary node 302 and the backup node 306 has failed, 3) whether the communication session between the primary node 302 and the auxiliary node 308 has failed, and 4) the state of the partner node 304 after the primary node 302 appears to be in a failed state based on failed communications with the primary node 302.

Figure 4:
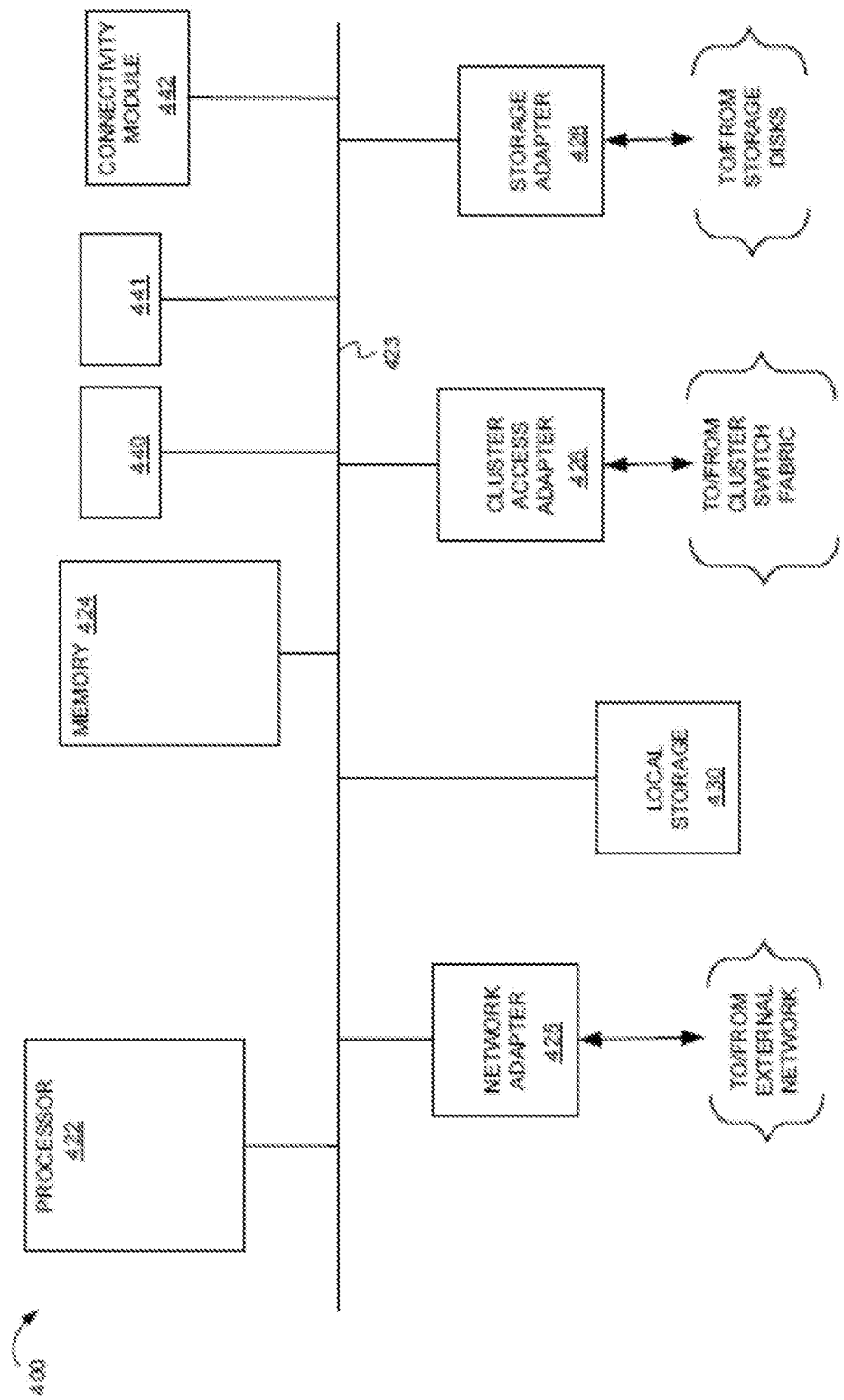
FIG. 4 depicts a block diagram of a node in a cluster, according to some features.

FIG. 4 depicts block diagram of a node in a cluster, according to some features. In particular, FIG. 4 depicts a node 400 which can be representative of the nodes of FIGS. 1-3. The node 400 includes a processor 422, a memory 424, a network adapter 425, a cluster access adapter 426, a storage adapter 428, an N-blade 440, a D-blade 441, a connectivity module 442, and a local storage 430 interconnected by a system bus 423.

Figure 5:
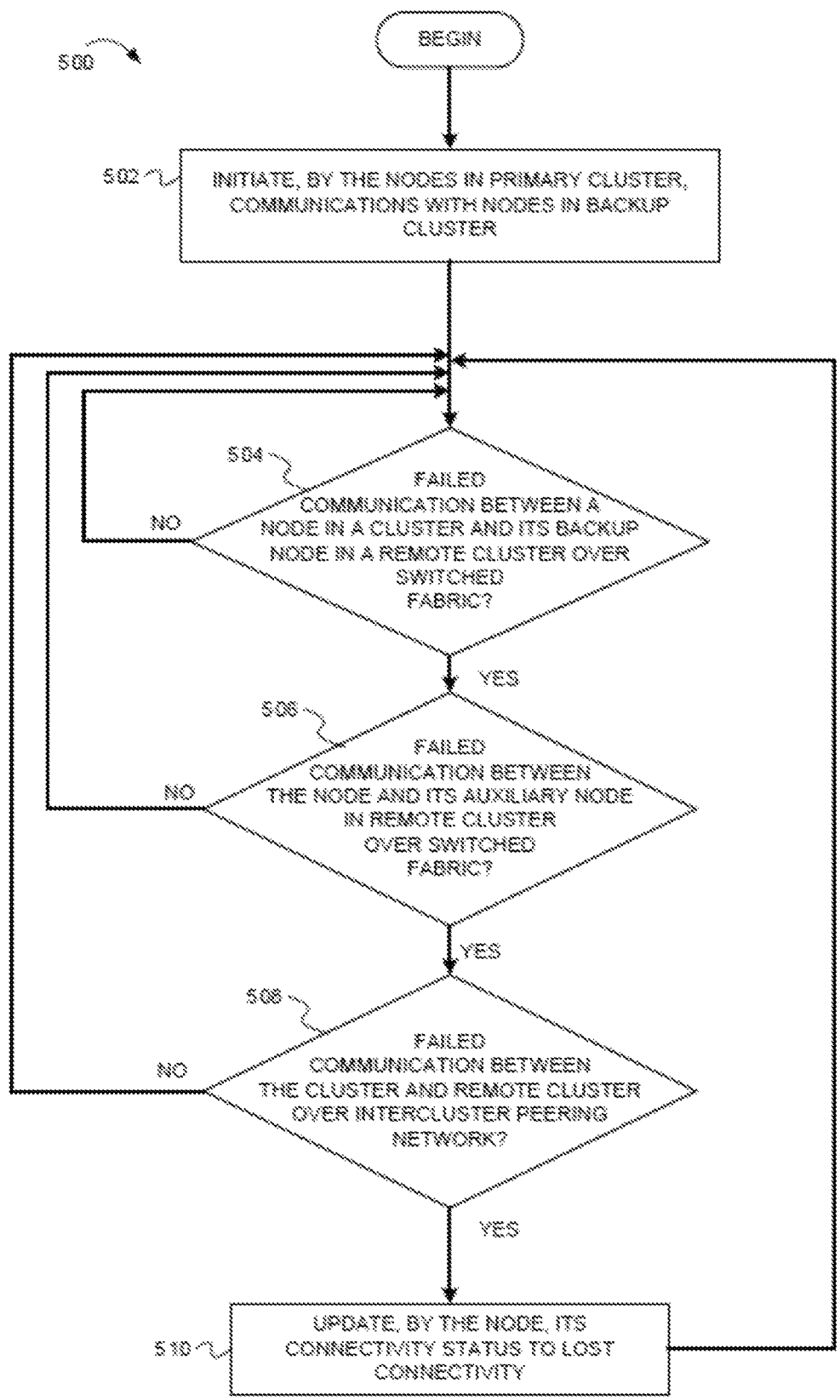
FIG. 5 depicts a flowchart of operations by a node in a primary cluster for monitoring its connectivity that can be used for cluster-failure detection, according to some features.

The N-blade 440, the D-blade 441, and the connectivity module 442 can be hardware, software, firmware, or a combination thereof. For example, the N-blade 440, the D-blade 441, and the connectivity module 442 can be software executing on the processor 422. The N-blade 441 includes functionality that enables the node 400 to connect to clients over a network. The D-blade 441 includes functionality to connect to one or more storage disks. It should be noted that while there is shown an equal number of N and D-blades in the illustrative cluster, there may be differing numbers of N and/or D-blades in accordance with some features. The connectivity module 442 includes functionality to interface with external devices (e.g., the failure detect module 150, other nodes, etc.) to communicate that a communication session between the node and the external device is still have active (not failed). Operations of the connectivity module 442 are depicted in FIG. 5 (which are described in more detail below).

The local storage 430 includes one or more storage devices, such as disks, for storage of local data by the node 400. The cluster access adapter 426 includes a number of ports adapted to couple the node 400 to other nodes of the metrocluster. In some examples, Ethernet can be used as the clustering protocol and interconnect media. In some examples, where the N-blades and D-blades are implemented on separate storage systems or computers, the cluster access adapter 426 is used by the N/D-blade for communicating with other N/D-blades of the metrocluster.

Each node 400 can be in a single or dual processor storage system executing a storage operating system that implements a high-level module, such as a file system, to logically organize the information as a hierarchical structure of named directories, files and special types of files called virtual disks (or generally "objects" or "data containers") on the disks. However, it will be apparent to those of ordinary skill in the art that the node 400 may alternatively comprise more than two processors. One processor 422 can execute the functions of the N-blade 440, while another processor 422 can execute the functions of the D-blade 441.

The memory 424 includes storage locations that are addressable by the processors and adapters for storing software program code and data structures, in accordance with some features. The processor and adapters may, in turn, comprise processing elements and/or logic circuitry configured to execute the software code and manipulate the data structures.

The network adapter 425 includes a number of ports adapted to couple the node 400 to one or more clients 180 over point-to-point links, wide area networks, virtual private networks implemented over a public network (Internet) or a shared local area network. The network adapter 425 thus may include the mechanical, electrical and signaling circuitry needed to connect the node 400 to the network. Illustratively, the network may be an Ethernet network or a Fibre Channel (FC) network. Each client may communicate with the node 400 by exchanging discrete frames or packets of data according to pre-defined protocols, such as TCP/IP.

The storage adapter 428 can cooperate with a storage operating system executing on the node 400 to access information requested by the clients. The information may be stored on any type of attached array of writable storage device media such as video tape, optical, DVD, magnetic tape, disks, bubble memory, electronic random access memory, micro-electro mechanical and any other similar media adapted to store information, including data and parity information. The storage adapter 428 can include a number of ports having input/output (I/O) interface circuitry that couples to the disks over an I/O interconnect arrangement, such as a conventional high-performance, FC link topology.

Example Node and Cluster Connectivity Determination Operations

Various operations to determine node and cluster connectivity in a metrocluster are now described. In particular, FIG. 5 depicts a flowchart of operations that can be performed by a node or other processing entity in a cluster (primary cluster and backup cluster) for monitoring the connectivity of the node or other processing entity that can be used for cluster-failure detection, according to some features. In particular, this determination of node and cluster connectivity can be used to detect failure of a cluster (see description of FIGS. 6-8 set forth below). A flowchart 500 of FIG. 5 is described in reference to FIGS. 1-4. The operations of the flowchart 500 can be performed by software, firmware, hardware or a combination thereof. For example, the operations of the flowchart 500 can be performed by software (e.g., the connectivity module 442) executing in the nodes of the clusters. In the examples below, the operations of the flowchart 500 are described in reference to the nodes in the primary cluster determining their connectivity status relative to their backup node and their auxiliary node in the backup cluster. However, the nodes in the backup cluster can perform the same operations relative to their backup node and their auxiliary node in the primary cluster. The operations of the flowchart 500 start at block 502.

At block 502, nodes in the primary cluster initiate communications with nodes in the backup cluster. With reference to FIGS. 1-4, each node in the primary cluster 102 can transmit changes being made to its data stored in its storage disks and memory to its associated backup node and auxiliary node. For example with reference to FIG. 3, the primary node 302 can transmit operations stored in the memory 370 for updating the storage disks 310 to the backup node 306 for storage in the memory 374 over the switch fabrics 352-354. The primary node 302 can also transmit the operations stored in the memory 370 for updating the storage disks 310 to the auxiliary node 308 for storage in the memory 376 over the switch fabrics 352-354. Similarly, the partner node 304 can transmit operations stored in the memory 372 for updating the storage disks 310 to the auxiliary node 308 for storage in the memory 376 over the switch fabrics 352-354. The partner node 304 can also transmit the operations stored in the memory 372 for updating the storage disks 310 to the backup node 306 for storage in the memory 374 over the switch fabrics 352-354. The primary node 302 and the partner node 304 can also transmit changes to the data stored in the storage disks 310 to the backup node 306 and the auxiliary node 308 for updating the data stored in the storage disks 312. These transmissions to the backup node 306 and the auxiliary node 308 can ensure that the data between the primary cluster 301 and the backup cluster 303 remain in sync. Operations of the flowchart 500 continue at block 504.

At block 504, a determination is made of whether there is failed communication between a node in a cluster and its backup node in a remote cluster over the switched fabric. Each node in the primary cluster can have a backup node in the backup cluster and vice versa. Therefore, if there is no communication between a node in the primary cluster and the backup node in the backup cluster, the communication between the node in the primary cluster and the backup node in the backup cluster can be considered failed or non-operational. For example with reference to FIG. 3, the primary node 302 communicates I/O operations stored in the memory 370 to access the storage disks 310 or updates to data stored in the storage disks 310 to the backup node 306. If there is no communication with the backup node 306, the primary node 302 can determine that the communication between itself and the backup node 306 over the switch fabrics 352-254 has failed. If there is no failed communication between a node in a cluster and its backup node in the remote cluster over the switched fabric, operations remain at block 504, where monitoring for failed communications continues. If there is a failed communication, operations continue at block 506.

At block 506, a determination is made of whether there is failed communication between the node in a cluster and its auxiliary node in the remote cluster over the switched fabric. As described above, each node in the primary cluster can have an auxiliary node in the backup cluster (and vice versa), in which there are communications between the node and the auxiliary node as part of the syncing between the primary cluster and the backup cluster. Therefore, if there is no communication between the node in the primary cluster and the auxiliary node in the backup cluster, the communication between the node in the primary cluster and the auxiliary node in the backup cluster can be considered failed or non-operational. For example with reference to FIG. 3, the primary node 302 communicates I/O operations stored in the memory 370 to access the storage disks 310 to the auxiliary node 308. If there is no communication with the auxiliary node 308, the primary node 302 determines that the communication between itself and the auxiliary node 308 over the switch fabrics 352-354 has failed. If there is no failed communication between a node in a primary cluster and its auxiliary node in a backup cluster over the switched fabric, operations return to block 504, where monitoring for failed communications continues. If there is a failed communication between a node in a primary cluster and its auxiliary node in a backup cluster over the switched fabric, operations continue at block 508.

At block 508, a determination is made of whether there is a failed communication between the cluster and the remote cluster over a network that is separate from the switch fabrics. In particular, if there are failed communications between the particular node on the primary cluster and both its recovery node and its auxiliary node, this additional determination is made regarding communications between the primary cluster and the backup cluster over the separate network. With reference to FIG. 1, a determination is made of whether there is no communication between the primary cluster 102 and the backup cluster 104 through both of the two network paths 178 over the network 156. If there is no failed communication between the primary cluster and the backup cluster over the separate network, operations return to block 504, where monitoring for failed communications continues. If there is a failed communication between the primary cluster and the backup cluster over the separate network, operations continue at block 510.

At block 510, the node in the primary cluster that has lost connectivity updates its connectivity status. In particular, the node can update its status in a table or other data structure in a machine-readable media within the node. This particular node may be considered to be in a failed state and/or lost connectivity. As further described below in reference to FIGS. 6-8, the status of this node, the other nodes in the cluster and the cluster itself can be used to determine if the entire cluster is in a failed state or not. If the entire cluster is considered to be in a failed state, operations can be initiated to have the backup cluster be the primary cluster. Alternatively or in addition, an administrator can be notified that the entire cluster has failed, the administrator can then initiate operations to have the backup cluster be the primary cluster. The operations of the flowchart 500 continue at block 504, where monitoring for failed communications for other nodes in the primary cluster continues.

Example Cluster-Failure Detection Operations

Various operations that can be performed remote from the clusters to monitor whether a cluster has failed are now described. In particular, FIGS. 6-8 depict flowcharts of operations for detection of failure of a cluster, according to some features.

Figure 6:
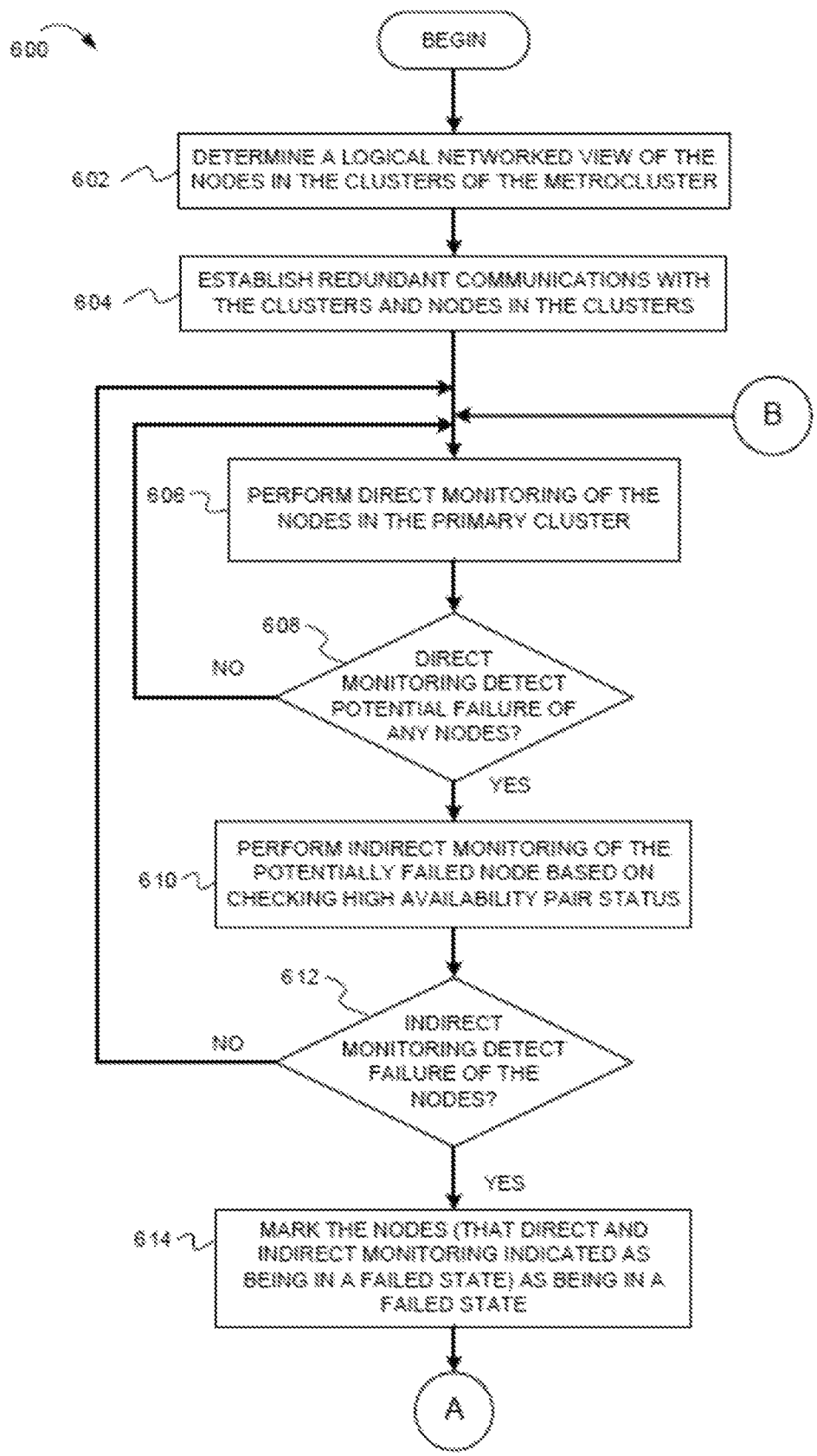
FIGS. 6-8 depict flowcharts of operations for detection of failure of a cluster, according to some features.
Figure 7:
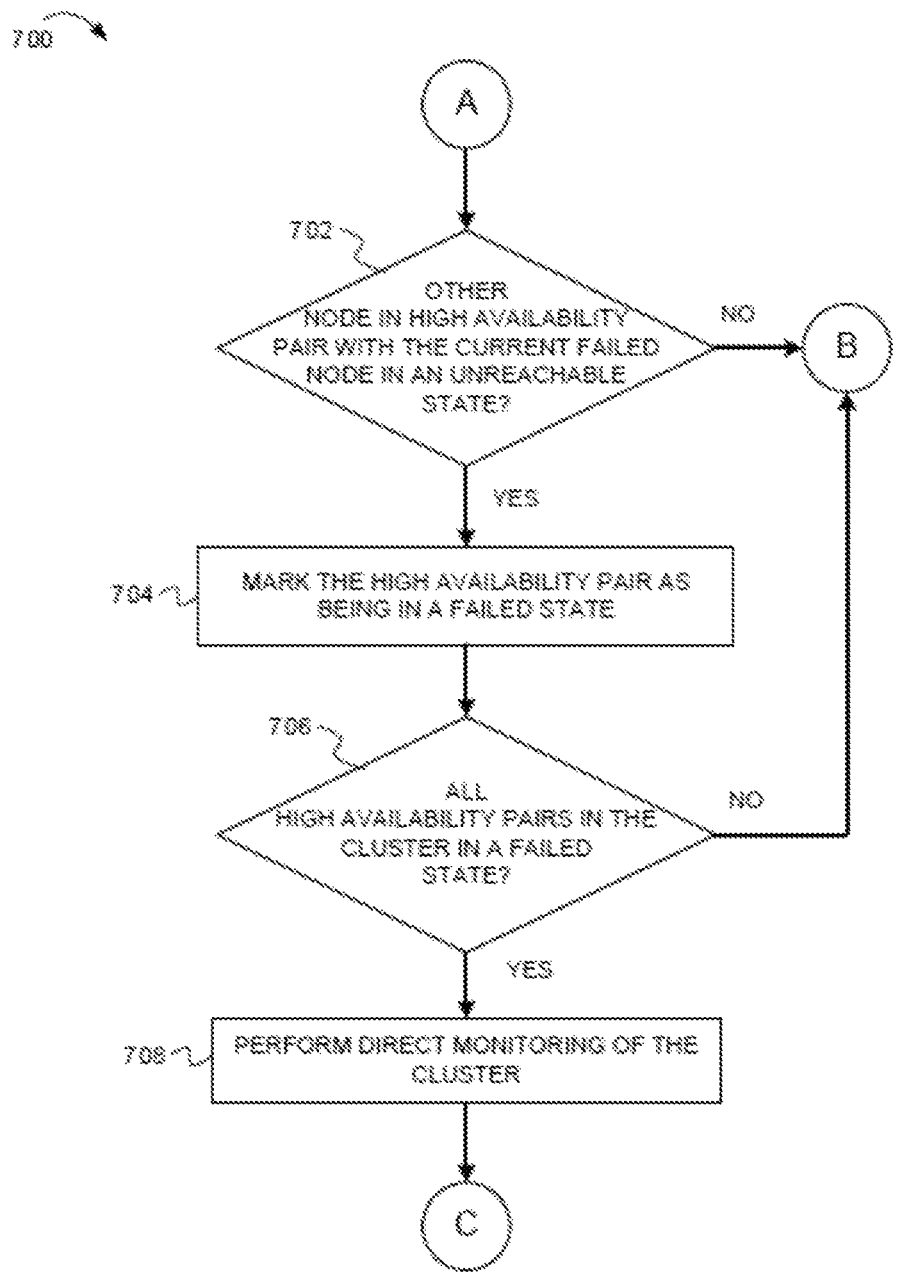
Figure 8:
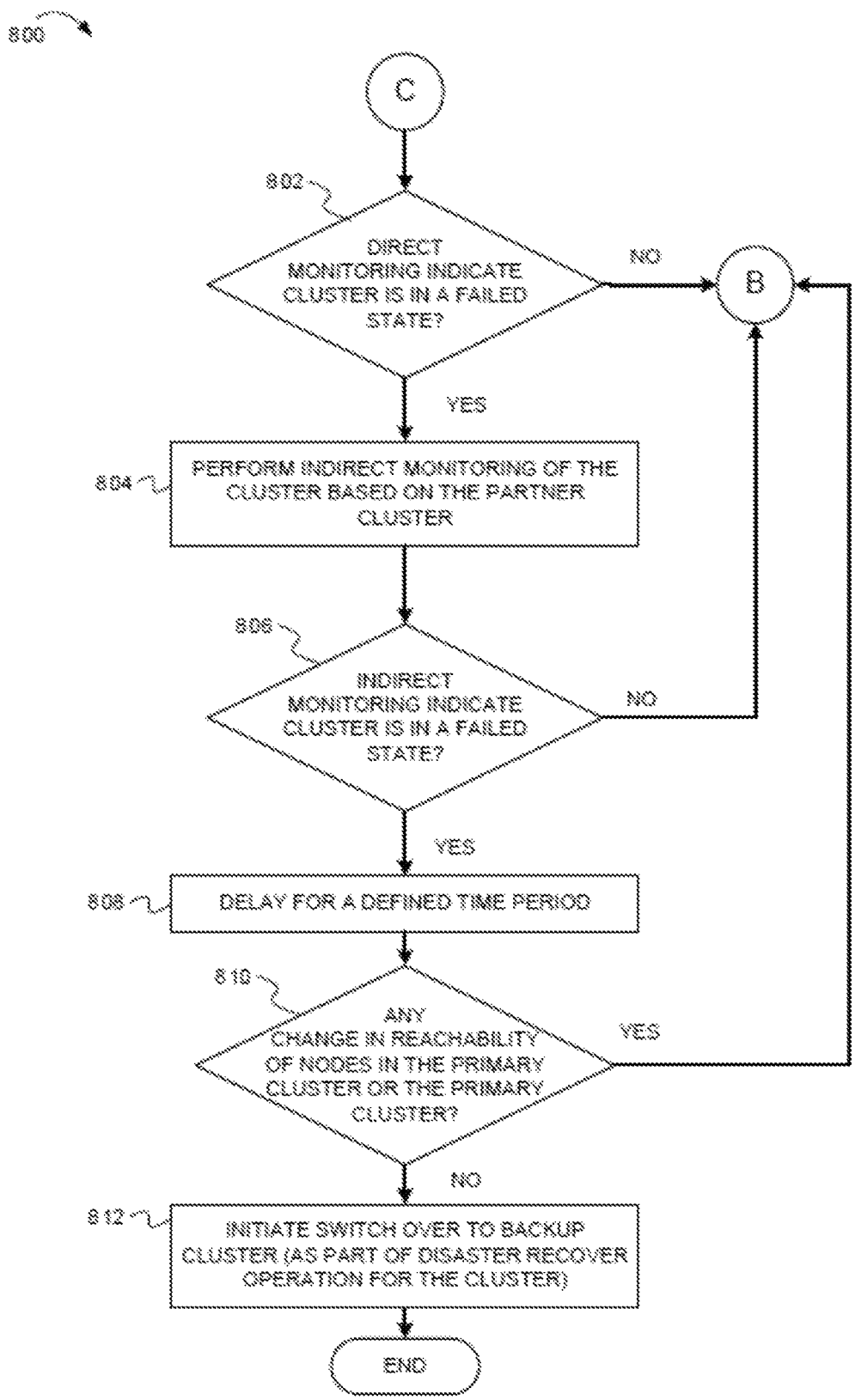

The operations depicted by the flowcharts in FIGS. 6-8 can be performed at least partially in parallel with the operations depicted by the flowchart in FIG. 5. A flowchart 600 of FIG. 6, a flowchart 700 of FIG. 7, and a flowchart 800 of FIG. 8 are described in reference to FIGS. 1-4. The operations of the flowcharts 600-800 are performed together and continue among each other as defined by transition points A, B, and C. The operations of the flowcharts 600-800 can be performed by software, firmware, hardware or a combination thereof. With reference to the example of FIG. 1, the operations can be performed by the failure detect module 150. The operations of the flowchart 600 start at block 602.

At block 602, the logical networked view of nodes in the clusters of a metrocluster are determined. With reference to FIG. 1, the failure detect module 150 can determine the logical networked view of nodes in the primary cluster 102 and the backup cluster 104 of the metrocluster 100. For example, as part of its installation, the failure detect module 150 can be configured with the network address, administrator name, and password of the primary cluster 102. Also, as part of its installation, the failure detect module 150 can be configured with the network address, administrator name and password of the backup cluster 104. At the start of execution, the failure detect module 150 can access this data to determine the number and parameters of each cluster in the metrocluster 100. Using this data, the failure detect module 150 can transmit discovery requests over the network 156 to the primary cluster 102 and the backup cluster 104. In response, each of the primary cluster 102 and the backup cluster 104 can transmit back its number of nodes, the network address of each of its nodes, each node's partner node in a high availability pair, each node's backup node and auxiliary node, etc. Based on this information, the failure detect module 150 can create a logical networked view of the nodes in each cluster.

Figure 9:
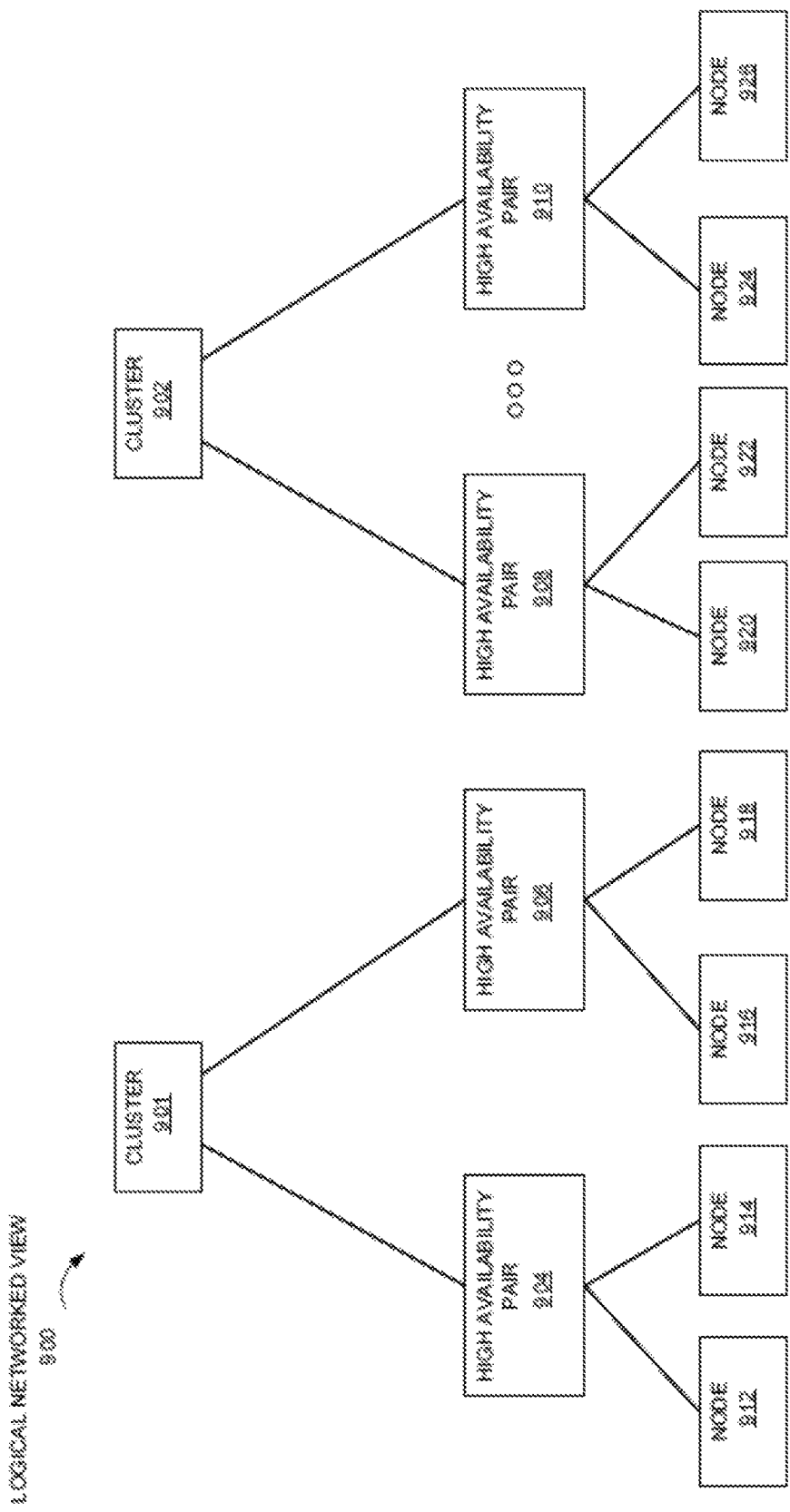
FIG. 9 depicts a logical networked view of nodes in two clusters of a metrocluster, according to some features.

To illustrate, FIG. 9 depicts a logical networked view of nodes in two clusters of a metrocluster, according to some features. A logical networked view 900 includes a hierarchical view of logical objects in a metrocluster. The logical networked view 900 is for multiple clusters in a metrocluster. The failure detect module 150 can create a logical networked view for each cluster in a metrocluster. The logical networked view 900 includes a cluster 901 and a cluster 902. The clusters 901-902 can have any number of high availability pairs (wherein each pair includes two nodes). In this example, the cluster 901 includes a high availability pair 904 and a high availability pair 906. The cluster 902 includes a high availability pair 908 and a high availability pair 910. The high availability pair 904 includes a pair of nodes (a node 912 and a node 914). The high availability pair 906 includes a pair of nodes (a node 916 and a node 918). The high availability pair 908 includes a pair of nodes (a node 920 and a node 922). The high availability pair 910 includes a pair of nodes (a node 924 and a node 926). Accordingly, the failure detect module 150 can create a logical networked view of the nodes in the clusters that can be used to detect failure of a cluster. For example, the failure detect module 150 can create data structure objects, wherein each data structure object represents one of the objects in the logical networked view 900. The failure detect module 150 can store state information about each object in the data structure object. For example, the failure detect module 150 can store "failed" into a data structure object for a node that has been determined to be in a failed state. Returning to FIG. 6, operations of the flowchart 600 continue at block 604.

At block 604, redundant communications can be established with the clusters and with the nodes in the clusters. For example, redundant Secure Shell (SSH)-based communications can be established for each cluster and with each node in the clusters. With reference to FIGS. 1-2, the failure detect module 150 can establish these redundant communications using the logical networked view of the nodes in the clusters. In particular, the failure detect module 150 can establish the redundant communications with the clusters and the nodes in the clusters using the network addresses assigned to the clusters and the nodes in the clusters. As shown in FIG. 2, the failure detect module 150 can establish the redundant communication sessions 250 with the cluster 201. The failure detect module 150 can also establish redundant communication sessions with each node in the cluster 201—the redundant communication sessions 252 with the node 202, the redundant communication sessions 254 with the node 204, the redundant communication sessions 258 with the node 206, and the redundant communication sessions 260 with the node 208. Operations of the flowchart 600 continue at block 606.

At block 606, direct monitoring of the nodes in the primary cluster is performed. With reference to FIGS. 1-2, the failure detect module 150 can perform the direct monitoring of the nodes of the primary cluster 102. For example, redundant Secure Shell (SSH)-based sessions can be established for each cluster and with each node in the clusters. With reference to FIGS. 1-2, the failure detect module 150 can establish these redundant sessions using the logical networked view of the nodes in the clusters. In particular, the failure detect module 150 can establish the redundant sessions with the nodes in the clusters using the network addresses assigned to the nodes in the clusters. As shown in FIG. 2, the failure detect module 150 can establish the redundant communication sessions 250 with each node in the cluster 201—the redundant communication sessions 252 with the node 202, the redundant communication sessions 254 with the node 204, the redundant communication sessions 258 with the node 206, and the redundant communication sessions 260 with the node 208. As further described below, the operations depicted in FIGS. 6-8 include multiple checks and monitoring of the reachability/connectivity of the nodes in the primary cluster and the primary cluster itself. According to some aspects, if these multiple checks and monitoring indicate that there is no reachability/connectivity of the nodes in the primary cluster and the primary cluster itself, the primary cluster is considered to be in a failed state. In response, switch over to the backup cluster from the primary cluster can be initiated (see block 812 described below). According to some aspects, if during any point in these operations depicted in FIGS. 6-8, a node in the primary cluster or the primary cluster itself that is considered unreachable becomes reachable, the operations can return to block 606 to restart the monitoring. Operations of the flowchart 600 continue at block 608.

At block 608, a determination is made of whether direct monitoring detects potential failure of any nodes. With reference to FIGS. 1-2, the failure detect module 150 can make this determination using a keep-alive timer to ping each node over the redundant communication sessions established with each node. For example, the keep-alive timer can be set to one second. If a node fails to respond before the expiration of the keep-alive timer, the failure detect module 150 can continue to ping the node. If the number of times the node fails to respond exceeds a retry count (e.g., three), the failure detect module 150 can determine that the node has failed based on direct monitoring. If direct monitoring does not detect failure of any nodes, operations return to block 606 (where direct monitoring of the nodes in the primary cluster continues). If the direct monitoring does detect failure of any nodes, operations continue at block 610.

At block 610, indirect monitoring of the nodes in the primary cluster (for those nodes in which direct monitoring failed) is performed. With reference to FIGS. 1-2, the failure detect module 150 can perform the indirect monitoring of the nodes of the primary cluster 102. The failure detect module 150 can perform the indirect monitoring of a node that failed direct monitoring by querying the high availability status of its partner node in the high availability pair. For example with reference to FIG. 3, assume that direct monitoring indicates that the primary node 302 has failed. The indirect monitoring would query the high availability status of the partner node 304. The high availability status of a node can be stored in a machine-readable media within the node. Accordingly, the failure detect module 150 can query the high availability status of the partner node stored in a machine-readable media within the partner node. Operations of the flowchart 600 continue at block 612.

At block 612, a determination is made of whether indirect monitoring detects potential failure of any nodes. With reference to FIGS. 1-2, the failure detect module 150 can make this determination based on high availability status of the partner node. For example, if the high availability status of the partner node is in a taken-over state, this indicates that the node being monitored has failed (e.g., reboot, shutdown, etc.). In contrast, if the high availability status of the partner node is in a normal state, this indicates that the node being monitored has not failed but is merely unreadable over the network (lost connectivity). Returning to the example with reference to FIG. 3 above, if the high availability status of the partner node 304 is in a taken-over state, the assumption is that the primary node 302 has failed. If the high availability status of the partner node 304 is in a normal state, the assumption is that the primary node 302 has not failed (but lost connectivity). If indirect monitoring does not detect failure of the nodes, operations return to block 606 (where direct monitoring of the nodes in the primary cluster continues). If the indirect monitoring does detect failure of any nodes, operations continue at block 614.

At block 614, the nodes (that direct and indirect monitoring indicate as being in a failed state) are marked as being in a failed state. With reference to FIGS. 1-2, the failure detect module 150 can mark these nodes as being in a failed state. For example, the failure detect module 150 can create a data structure having defined the logical objects of a cluster as depicted in FIG. 9. Each logical object in the data structure can store an indication of being in a failed state or not. The data structure can be stored in a machine-readable medium in the server that is hosting the failure detect module 150. In this example, the failure detect module 150 can update the logical object for this failed node in the data structure to indicate that the node is in a failed state. Operations of the flowchart 600 continue at transition point A, which continues at transition point A in the flowchart 700.

The operations of the flowchart 700 are now described. The flowchart 700 begins at the transition point A (that is a continuation from transition point A of the flowchart 600). From the transition point A, operations of the flowchart 700 continue at block 702.

At block 702, a determination is made of whether the other node in high availability pair with the current failed node is in an unreachable state. With reference to FIGS. 1-2, the failure detect module 150 can make this determination. For example with reference to FIG. 3, assuming that the primary node 302 is in a failed state, the failure detect module 150 can determine if there is no connectivity with the partner node 304 (similar to the lack of connectivity for the current failed node). The failure detect module 150 can make this determination using direct monitoring of the partner node (similar to direct monitoring that was performed on the current failed node (see description at block 608 described above)). If the other node in the high availability pair is not in an unreachable state, operations continue at transition point B, which returns to transition point B in the flowchart 600 (where direct monitoring of the nodes in the primary cluster continues). If the other node in the high availability pair is in an unreachable state, operations continue at block 704.

At block 704, the high availability pair is marked as being in a failed state. In other words, if there is no connectivity with both nodes in a high availability pair, the high availability pair can be considered as being in a failed state. With reference to FIGS. 1-2, the failure detect module can mark the high availability pair as being in failed state. For example, the failure detect module 150 can update the logical object for this failed high availability pair in the data structure (described above) to indicate that the high availability pair is in a failed state. Operations of the flowchart 700 continue at block 706.

At block 706, a determination is made of whether all high availability pairs in the cluster are in a failed state. With reference to FIGS. 1-2, the failure detect module 150 can make this determination. For example with reference to FIG. 2, assuming that the high availability pair 230 is in a failed state, the failure detect module 150 can determine if the high availability pair 232 is also in a failed state. The failure detect module 150 can make this determination based on querying the data structure having the logical objects of a cluster that is stored in a machine-readable media (as described above). If all high availability pairs in the cluster are not also in a failed state, operations continue at transition point B, which returns to transition point B in the flowchart 600 (where direct monitoring of the nodes in the primary cluster continues). If all high availability pairs in the cluster are also in a failed state, operations continue at block 708.

At block 708, direct monitoring of the cluster is performed. With reference to FIGS. 1-2, the failure detect module 150 can perform the direct monitoring of the primary cluster 102. The failure detect module 150 can perform direct monitoring by monitoring whether communication is still available over the two network paths 170. For example, the failure detect module 150 can set up a keep-alive timer to ping the primary cluster 102. To illustrate, the keep-alive timer can be set to one second with a retry count of three. Operations of the flowchart 700 continue at transition point C, which continues at transition point C in the flowchart 800.

The operations of the flowchart 800 are now described. The flowchart 800 begins at the transition point C (that is a continuation from transition point C of the flowchart 700. From the transition point C, operations of the flowchart 800 continue at block 802.

At block 802, a determination is made of whether direct monitoring indicates that the cluster is in a failed state. With reference to FIGS. 1-2, the failure detect module 150 can make this determination. For example, a redundant Secure Shell (SSH)-based session can be established with the cluster. The failure detect module 150 can establish the redundant session with the cluster using the network address assigned to the cluster. As described above, the failure detect module 150 can perform direct monitoring by using a keep-alive timer to ping the primary cluster 102. For example, the keep-alive timer can be set to one second. If the primary cluster 102 fails to respond before the expiration of the keep-alive timer, the failure detect module 150 can continue to ping the primary cluster 102. If the number of times the primary cluster 102 fails to respond exceeds a retry count (e.g., three), the failure detect module 150 can determine that the primary cluster 102 has failed based on direct monitoring. If the direct monitoring indicates that the cluster is not in a failed state, operations continue at transition point B, which returns to transition point B in the flowchart 600 (where direct monitoring of the nodes in the primary cluster continues). If the direct monitoring indicates that the cluster is in a failed state, operations continue at block 804.

At block 804, indirect monitoring of the cluster is performed. In other words, if all nodes and the high availability pairs in a cluster are unreachable or failed and direct monitoring indicates that the cluster has failed, indirect monitoring of the cluster can be performed as a further check of whether the cluster has failed. With reference to FIGS. 1-2, the failure detect module 150 can perform the indirect monitoring of the primary cluster 102. The failure detect module 150 can perform indirect monitoring by checking the connectivity status of the backup cluster 104. For example, the backup cluster 104 can verify whether there is connectivity with the primary cluster 102 along any of the network paths between the two clusters. The backup cluster 104 can verify whether there is any connectivity with the primary cluster 102 over both the switch fabrics 152 and 154. The backup cluster 104 can also verify whether there is any connectivity with the primary cluster 102 over both the two network paths 178 over the network 156. Additionally, each node in the backup cluster 104 can verify whether there is any connectivity with associated nodes in the primary cluster 102 over both the switch fabrics 152 and 154. Each node in the backup cluster 104 can also verify whether there is any connectivity with associated nodes in the primary cluster 102 over both the two network paths 178 over the network 156. For example with reference to FIG. 3, the backup node 306 in the backup cluster 303 can verify connectivity with the primary node 302 and the partner node 304 in the primary cluster 304. Also, the auxiliary node 308 in the backup cluster 303 can verify connectivity with the primary node 302 and the partner node 304 in the primary cluster 304. Operations of the flowchart 800 continue at block 806.

At block 806, a determination is made of whether indirect monitoring indicates that the cluster is in a failed state. With reference to FIGS. 1-2, the failure detect module 150 can make this determination. Returning to the example described above, if the backup cluster 104 is unable to connect with the primary cluster 102 over both of the switch fabrics 152-152 and the network 156 and if each node in the backup cluster 104 is unable to connect with the associated nodes (its backup node and its auxiliary node) in the primary cluster 102 over both of the switch fabrics 152-152 and the network 156, the failure detect module 150 can determine that the indirect monitoring indicates that the primary cluster 102 is in a failed state. However, if there is any connectivity between the backup cluster 104 and the primary cluster 104 or between any of the nodes of the backup cluster 104 and the associated nodes of the primary cluster 104, the failure detect module 150 can determine that the indirect monitoring indicates that the primary cluster 102 is not in a failed state. If the indirect monitoring indicates that the cluster is not in a failed state, operations continue at transition point B, which returns to transition point B in the flowchart 600 (where direct monitoring of the nodes in the primary cluster continues). If the indirect monitoring indicates that the cluster is in a failed state, operations continue at block 808.

At block 808, there is a delay for a defined time period prior to initiating a switch over to the backup cluster from the primary cluster. With reference to FIGS. 1-2, the failure detect module 150 can delay for a defined time period to determine whether any node in the primary cluster or the primary cluster itself is now reachable. For example, if one of the nodes in the backup cluster is able to connect with one of its associated nodes in the primary cluster over one of the switched fabrics or other network, at least one node is considered reachable. Also if the backup cluster is able to connect with the primary cluster over one of the switched fabrics or other network, the primary cluster is considered reachable. In another example, if communication over the network between a node in the primary cluster and the failure detect module is restarted, that node is considered reachable. Similarly, if communication over the network between the primary cluster and the failure detect module is restarted, the primary cluster is considered reachable. Operations of the flowchart 808 continue at block 810.

At block 810, a determination is made of whether there is any change in the reachability of nodes in the primary cluster or the primary cluster itself. As described above, if any node in the backup cluster, the backup cluster, or the failure detect module is able to communicate with any node in the primary cluster or with the primary cluster itself, then the primary cluster is considered to be reachable and not in a failed state. In other words, if the reachability of the nodes in the primary cluster or the primary cluster itself, the failure detect module 150 assumes that the primary cluster is not in a failed state. Accordingly, the failure detect module 150 would abort the operation to switch from the primary cluster to the backup cluster. Thus, if there is any change in the reachability of nodes in the primary cluster or the primary cluster itself, operations of the flowchart 800 continue at transition point B, which returns to transition point B in the flowchart 600 (where direct monitoring of the nodes in the primary cluster continues). If there is no change in the reachability of nodes in the primary cluster or the primary cluster itself, operations of the flowchart 800 continue at block 812.

At block 812, switch over to the backup cluster is initiated (as part of a disaster recovery operation for the cluster). For example, the failure detect module 150 can initiate operations to have the backup cluster 104 be the primary cluster. Alternatively or in addition, an administrator can be notified that the entire cluster has failed, the administrator can then initiate operations to have the backup cluster 104 be the primary cluster. The operations of the flowchart 800 are complete.

As will be appreciated by one skilled in the art, some aspects may be in a system, method or computer program product. Accordingly, some aspects may take the form of entirely hardware, entirely software (including firmware, resident software, micro-code, etc.) or a combination of software and hardware aspects that may all generally be referred to herein as a "circuit," "module" or "system." Furthermore, some aspects may take the form of a computer program product included in one or more computer readable medium(s) having computer readable program code included thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code included therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code included on a computer readable medium may be transmitted using any appropriate medium, including but not limited to wireless, wireline, optical fiber cable, RF, etc., or any suitable combination of the foregoing.

Computer program code for carrying out operations of various aspects may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some aspects are described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the various aspects. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the various aspects.

What is claimed is:

1. A method comprising:
monitoring a communication session between a first cluster and a second cluster;
identifying a failure condition for the first cluster as a communication failure between a first node within the first cluster and a second node within the second cluster based upon a status of the communication session;
switching over from the first cluster to the second cluster based upon the failure condition.

2. The method of claim 1, comprising:
performing indirect monitoring of the first cluster.

3. The method of claim 1, wherein the second node performs storage access operations that were to be performed by the first node based upon switching over from the first cluster to the second cluster.

4. The method of claim 1, wherein the first node has a first operational state that is a failed state.

5. The method of claim 4, wherein the first node is paired with the second node such that a second operational state of the second node is a taken-over state indicating that the second node is to process storage access operations that were to be performed by the first node.

6. The method of claim 5, wherein the failure condition corresponds to the second operational state being in the taken-over state and the first operational state being in the failed state.

7. The method of claim 1, wherein the monitoring is performed remote from the first cluster.

8. The method of claim 1, wherein the second node within the second cluster takes over storage access operations from the first node within the first cluster in response to a failure of the first node.

9. The method of claim 8,
performing direct monitoring of the first cluster based on connectivity with the first cluster from a remote location based upon failure of a plurality of nodes in the first cluster.

10. The method of claim 9, comprising:
performing indirect monitoring of the first cluster based upon the direct monitoring of the first cluster indicating failure of the connectivity with the first cluster, wherein the failure condition corresponds to a result of the indirect monitoring of the first cluster indicating failure of the first cluster.

11. The method of claim 10, wherein the performing indirect monitoring comprises determining whether a backup cluster has lost connectivity with the first cluster, wherein the failure of the first cluster comprises the backup cluster losing connectivity with the first cluster.

12. The method of claim 11, wherein each node of the plurality of nodes has an associated backup node and an associated auxiliary node in the backup cluster, wherein the associated auxiliary node is a backup node for the associated backup node.

13. The method of claim 12, wherein a result of the indirect monitoring of the first cluster indicates failure of the first cluster based upon a loss of connectivity between each node of the plurality of nodes and the associated backup node.

14. The method of claim 13, wherein a result of the indirect monitoring of the first cluster indicates failure of the first cluster based upon loss of connectivity between each storage node of the plurality of nodes and the associated auxiliary node.

15. A non-transitory machine readable medium having stored thereon instructions, which when executed by a machine, causes the machine to:
monitor a communication session between a first cluster and a second cluster;
identify a failure condition for the first cluster as a communication failure between a first node within the first cluster and a second node within the second cluster based upon a status of the communication session;
switch over from the first cluster to the second cluster based upon the failure condition.

16. A computing device comprising:
a processor; and
memory having instructions stored thereon, the instructions executable by the processor to cause the computing device to:
monitor communication between a first node of a first cluster and an auxiliary node in a second cluster;
identify a failure condition for the first node based upon a status of the communication;
switch over from the first node to the auxiliary node based upon the failure condition.

17. The computing device of claim 16, wherein the instructions cause the computing device to:
perform direct monitoring of the first cluster based on connectivity with the first cluster from a remote location based upon failure of a plurality of nodes in the first cluster.

18. The computing device of claim 17, wherein the instructions cause the computing device to:
perform indirect monitoring of the first cluster based upon the direct monitoring of the first cluster indicating failure of the connectivity with the first cluster, wherein the failure condition corresponds to a result of the indirect monitoring of the first cluster indicating failure of the first cluster.

19. The computing device of claim 18, wherein the indirect monitoring is performed to determine whether a backup cluster has lost connectivity with the first cluster, wherein the failure of the first cluster comprises the backup cluster losing connectivity with the first cluster.

20. The computing device of claim 16, wherein the communication is monitored by a remote failure detection module.

* * * * *